March 31, 1964  I. V. ABADJIEFF  3,126,679
DEVICE FOR POINT THINNING OF DRILLS
Filed Oct. 20, 1961
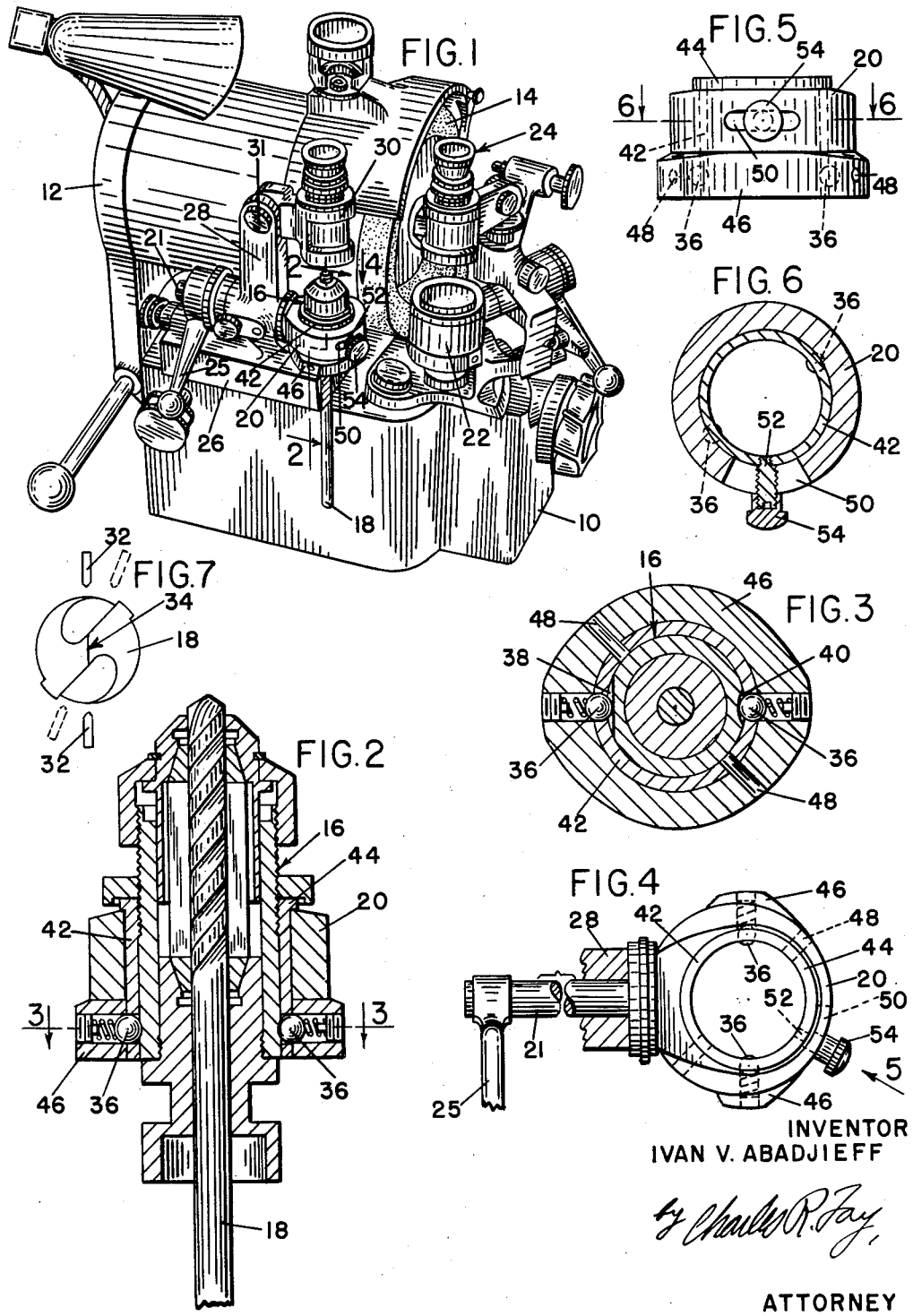
INVENTOR
IVAN V. ABADJIEFF
ATTORNEY

United States Patent Office 3,126,679
Patented Mar. 31, 1964

3,126,679
DEVICE FOR POINT THINNING OF DRILLS
Ivan V. Abadjieff, Worcester, Mass., assignor to Leland-Gifford Company, Worcester, Mass., a corporation of Massachusetts
Filed Oct. 20, 1961, Ser. No. 146,613
6 Claims. (Cl. 51—219)

This invention relates to an improvement on the drill sharpener and point thinner device for which patent was applied for July 18, 1957, Serial No. 672,837, now Patent No. 3,022,609, granted February 27, 1962. The principal object of the present invention resides in the provision of a quick and easy angular adjustment for the collet drill holder and the drill as a unit when applied to the point thinning collet holder receiver, this adjustment facilitating accurate positioning of the chisel edge of the drill relative to the edge of the wheel to provide the point thinning action desired. When thinning the point of a drill having a different helix angle from the previous drill processed, the relative positions of the drill lips vary, and since the drill is held in the drill holder in which it was sharpened, it is therefore necessary to provide an angular adjustment of the drill.

In the present invention this is done by bodily adjusting the drill and the collet drill holder together, as one, in the receiver for the thinning operation, thus avoiding the necessity of readjusting the drill in the collet holder itself, and this operation is accomplished quickly and easily while observing the point of the sharpened drill in the lens provided for the purpose, whereas without the improvement herein it was occasionally necessary to loosen the collet and adjust the drill therein while thus making it difficult to precisely rotationally adjust the drill to the degree desired in order to position the drill point lips where they should be for accurate thinning of the point.

The invention further relates to arrangements and combinations of parts which will be hereinafter described and more particularly set forth in the appended claims.

Reference is to be had to the accompanying drawings, in which

FIG. 1 is a perspective view illustrating the drill point sharpener and thinner;

FIG. 2 is an enlarged sectional view, taken on the line 2—2 in FIG. 1;

FIG. 3 is a section on line 3—3 of FIG. 2;

FIG. 4 is an enlarged view in plan, looking in the direction of the arrow 4 in FIG. 1, parts being in section;

FIG. 5 is a view in side elevation, looking in the direction of the arrow 5 in FIG. 4;

FIG. 6 is a section on line 6—6 of FIG. 5, and

FIG. 7 is a diagrammatic view illustrating the setting of the drill point with reference to pointers or guide lines.

Referring to FIG. 1 in general, the apparatus disclosed here is closely similar to that shown in the above identified application and is used in the same manner. Briefly, however, in order to properly define the purpose and operation of the present invention, this apparatus consists of a base 10 provided with an electric motor in a housing 12, this motor and housing being swingable in the plane of the face of a wheel 14 to sharpen a drill held in an adjustable collet holder or the like generally indicated by the reference numeral 16. This collet holder may be more or less according to that disclosed in the copending application above referred to, and in any event it holds the drill 18 firmly for disposition either in the left-hand point thinning collet holder receiver 20 or the right-hand point sharpening collet holder receiver 22. The receiver 22 is mounted on a supporting member provided with means for setting the same at the desired angles with reference to the face of the wheel 14 to properly sharpen the same, and it is also provided with means for quickly and easily moving the drill and its collet holder bodily 180° about the axis of the drill to sharpen both sides. It is also provided with a magnifying lens assembly generally indicated at 24 and means is provided for correctly setting the drill holder, etc. for the sharpening operation, all as above described in the application above referred to.

The left-hand or point thinning collet holder receiver 20 is mounted to swing with a horizontal shaft 21 at a right angle to the representation of the drill 18 so that the drill point may be presented to the wheel for the thinning operation by a handle 25. Also the entire mount which is indicated at 26 is likewise adjustable and on a standard 28 on shaft 21 there is provided a viewer 30 (pivoted at 31) for observing an enlarged image of the point of the drill as perhaps best shown in FIG. 7. This lens 30 is provided with a pair of guide lines or markers 32, 32 (see FIG. 7), wherein they are shown diagrammatically. Upon looking down through the lens 30, these guide lines will appear as indicated in FIG. 7 and if not clearly aligned with the chisel edge 34 as represented in FIG. 7, then it is necessary to rotate the drill so as to achieve this relationship of parts before performing the thinning operation.

The left-hand collet receiver 20 is provided with a pair of spring-pressed steel balls (see FIG. 3), these being indicated at 36, 36 and the drill collet holder 16 is provided with the chordal flat 38 and vertical groove 40 to allow 180° reversal of the drill holder with its drill, the balls ensuring an exact 180° turn.

However, in cases where adjustment is necessary, as represented by the guide markers (FIG. 7), the invention contemplates the provision of an interior sleeve member 42 for the receiver 20, into which the holder 16 fits. The sleeve member 42 holds the steel balls 36 so that if the sleeve member 42 is rotated relative to the fixed receiver portion 20 mounted on shaft 21, then of course the drill collet holder 16 and the drill 18 held herein are also so rotated together.

The sleeve 42 is provided with a flange or the like 44 by which it is mounted on the main body of the holder 20 and secured at its lower end there is an auxiliary receiver portion 46 secured to the sleeve 42 by pins 48. The member 46 and sleeve 42 carry the steel balls together with means for holding the same in position such as for instance resilient springs, rings or the like.

In the wall of the member 20, there is a peripheral slot 50 and in the wall of the sleeve 42 there is secured a screw 52 having a manually operated nut 54. The screw extends through the slot, and as will be seen in FIG. 6, the nut is easily manually backed off to release sleeve 42 from the main body portion 20 of the collet holder receiver. Then sleeve 42 is rotatably movable about the central axis of the drill itself and this action carries with it the auxiliary portion 46 of the holder, the balls 36, 36, etc.

From the above it will be seen therefore that if a chisel edge 34 is not in alignment with the marks 32, 32 as seen in viewer 30, then the binder screw is let off and used as a handle to rotate the parts 46, 42 and 16 until the marks 32, 32 coincide with the chisel edge, in which event the binder screw is retightened and the device is ready for the thining operation which is accomplished as will be apparent from the description in the above identified patent application.

Of course if a series of drills of similar helix angle are sharpened and thinned, there should be no reason to change the angle of the holders from drill to drill, but where the sharpening is done with drills of different sizes and different helix angles, etc., then it is necessary to make the slight angular adjustment of the drill as above described in order to obtain a complete and accurate thinning action.

Having thus described my invention and the advantages thereof, I do not wish to be limited to the details herein disclosed, otherwise than as set forth in the claims, but what I claim is:

1. A combination drill grinding and point thinning apparatus comprising a base, a pair of separate and independent receivers on the base, a drill grinding tool on the base, a collet drill holder adapted to be received and held selectively in either one of said receivers, a collet in the holder, a drill in the collet, said tool providing for sharpening the drill while the drill collet holder, collet and drill are held in one receiver, said tool also providing for thinning of the point of the drill while the drill collet holder, collet and drill are held in the second of said receivers, and means on said second receiver for angularly adjusting the collet drill holder, collet and drill together as a unit about the axis thereof in said receiver, said adjusting means including an element to clamp said collet drill holder, collet and drill in angularly adjusted position with respect to said second-named receiver and said tool without changing the relative radial relation between the drill, the collet, and the collet holder.

2. The combination as recited in claim 1 wherein the second-named receiver comprises two main parts, one part being adjustable and receiving the collet drill holder, the other part being relatively fixed, and means in the adjustable part for selectively holding the collet drill holder in either of two positions 180° apart, said last-named means being angularly adjustable with said rotatable part in respect to said fixed part.

3. A combination drill grinding and point thinning apparatus comprising a base, a pair of separate and independent receivers on the base, a drill grinding tool on the base, a collet drill holder adapted to be received and held selectively in either one of said receivers, said tool providing for sharpening the drill while the drill collet holder is held in one receiver, means for orienting a drill held in the drill holder relative to the drill holder and the said one receiver to properly present the drill to the tool for sharpening, said tool also providing for thinning of the point of the drill while the drill collet holder is held in the second of said receivers, and means on said second receiver for angularly adjusting the collet drill holder and drill together as a unit about the axis thereof in said receiver, said adjusting means including an element to clamp said collet drill holder and drill in angularly adjusted position with respect to said second-named receiver and said tool to properly present the sharpened drill end to the tool for the thinning operation.

4. A drill sharpening and drill point thinning apparatus comprising a base, a guiding tool thereon, a pair of separate, independent drill holder receivers, on the base, a collet, a single collet holder for the collet, said collet holding and clamping a drill and the collet holder, collet, and drill being received and held as a unit selectively in either receiver, one receiver including means for properly orienting the drill for the sharpening operation, means for moving the one receiver to the tool for the sharpening operation, the second receiver including means for moving it to the tool for the point thinning operation, and means on said second receiver for angularly adjusting the collet, collet holder, and oriented drill therein as a unit about the axis of the drill as held in the second receiver without changing the relative radial relation between the drill, collet, and collet holder.

5. A receiver for a drill holding collet comprising a main relatively fixed body portion, a rotatable portion in the main body portion, said rotatable portion including means for holding the collet drill holder selectively in either of two positions at a predetermined number of angularly disposed degrees apart, means securing the two portions of the receiver together, said securing means being releasable for angularly adjusting the rotatable portion relative to the main body portion, the adjustment including means moving the means for holding the collet drill holder in the two positions, the main body portion comprising a cylindrical member and the rotatable portion comprising a sleeve therein and an auxiliary part secured to the sleeve and located exteriorly of the main body portion, the means for holding the collet drill holder selectively in two positions being mounted in the auxiliary part and extending through the sleeve to engage the collet drill holder.

6. A receiver for a drill holding collet comprising a main relatively fixed body portion, a rotatable portion in the main body portion, said rotatable portion including means for holding the collet drill holder selectively in either of two positions at a predetermined number of angularly disposed degrees apart, means securing the two portions of the receiver together, said securing means being releasable for angularly adjusting the rotatable portion relative to the main body portion, the adjustment including means moving the means for holding the collet drill holder in the two positions, the main body portion comprising a cylindrical member having a circumferentially arranged slot, and the rotatable portion comprising a sleeve in the cylindrical member, and the securing means for the two portions comprising an element secured to the sleeve, said element extending through the slot in the cylindrical member, and a locking device on the element to clamp it to the cylindrical portion at a selected point along the slot.

References Cited in the file of this patent

UNITED STATES PATENTS

| | | |
|---|---|---|
| 1,710,647 | Probert et al. | Apr. 23, 1929 |
| 2,124,093 | Wells | July 19, 1938 |
| 2,217,545 | Guenther | Oct. 8, 1940 |
| 2,805,522 | Dayton | Sept. 10, 1957 |

FOREIGN PATENTS

| | | |
|---|---|---|
| 834,335 | Germany | Mar. 17, 1952 |